United States Patent

Baumann et al.

Patent Number: 5,770,235
Date of Patent: Jun. 23, 1998

[54] DROP FORMING DRUM FOR THE MANUFACTURE OF PASTILLES

[75] Inventors: Warnfried Baumann, Beinstein; Reinhard Froeschke, Weinstadt, both of Germany

[73] Assignee: Santrade Ltd., Lucerne, Switzerland

[21] Appl. No.: 669,537

[22] PCT Filed: Sep. 28, 1995

[86] PCT No.: PCT/EP95/03831

§ 371 Date: Aug. 30, 1996

§ 102(e) Date: Aug. 30, 1996

[87] PCT Pub. No.: WO96/14929

PCT Pub. Date: May 23, 1996

[30] Foreign Application Priority Data

Nov. 16, 1994 [DE] Germany .......................... 44 40 875.7

[51] Int. Cl.⁶ .................................................. B30B 11/20
[52] U.S. Cl. ................................. 425/8; 264/13; 425/365; 425/382 R; 425/464
[58] Field of Search ..................................... 425/8, 382 R, 425/382.3, 464, 462, 365; 264/13

[56] References Cited

U.S. PATENT DOCUMENTS

| | | | |
|---|---|---|---|
| 3,786,645 | 1/1974 | Cann ........................................ | 425/382 |
| 4,029,459 | 6/1977 | Schmiedeke ............................. | 425/202 |
| 4,397,628 | 8/1983 | Pinto et al. .......................... | 425/376 B |
| 4,623,307 | 11/1986 | Froeschke ................................... | 425/8 |
| 4,963,084 | 10/1990 | Froeschke . | |
| 5,013,498 | 5/1991 | Froeschke .................................. | 264/8 |
| 5,286,181 | 2/1994 | Schwager ................................... | 425/8 |
| 5,332,378 | 7/1994 | Harreither ................................. | 425/8 |
| 5,382,145 | 1/1995 | Harreither ............................ | 425/382.3 |
| 5,401,938 | 3/1995 | Froeschke et al. . | |
| 5,492,463 | 2/1996 | Schwager ................................... | 425/8 |

FOREIGN PATENT DOCUMENTS 0 303 755  2/1989  European Pat. Off. .

Primary Examiner—Jay H. Woo
Assistant Examiner—Iuvie A. Schwartz
Attorney, Agent, or Firm—Burns, Doane, Swecker & Mathis, L.L.P.

[57] ABSTRACT

A hollow drum is rotatable about a horizontal axis and includes openings around its circumference for discharging drops of a free-flowing substance onto a cooling belt in the manufacture of pastilles. A stationary body disposed inside the drum is spaced from the interior surface of a front side of the drum to form therewith a sickle-shaped gap leading to the drop-forming zone. A channeling member rests against an external surface of the front side of the drum to form therewith an upwardly open channel. The supply passage which delivers the freely flowable substance to the drum can be defined by the channel, whereby the substance would be fed into the upwardly open end thereof and would flow into the gap through the drum openings. Alternatively, the supply passage could be defined by a space within the stationary body which communicates with the gap at a location disposed above the drop-forming zone.

7 Claims, 1 Drawing Sheet

DROP FORMING DRUM FOR THE MANUFACTURE OF PASTILLES

BACKGROUND OF THE INVENTION

The invention pertains to a device for manufacturing pastilles comprising a rotatable, horizontally installed drum with openings around its entire circumference; a laterally attached material channeling device mounted around its circumference; a stationary interior body installed inside this drum forming a sickle-shaped gap between a portion of its circumference and the interior surface of the drum, whereby the end of the gap that constitutes a leading end thereof with reference; to the turning direction of the drum is located in the lowest part of the circumference of the drum; a feeder device for a viscous, free-flowing liquefied material that exits through the openings of the drum in the form of drops; and a conveyor or cooling surface below the drum for transporting the drops exiting from the drum.

Devices of this kind are known from EPO 339 325-A1, corresponding to U.S. Pat. No. 5,013,498. These devices are designed with a channel installed in an axial direction inside the stationary interior body for supplying the free-flowing liquefied material and with connection borings leading from the channel to a gap located in an axial direction at the circumference of the interior body, whereby the interior body is provided with a strip equipped with nozzles through which the material is forced out and enters the drum because of the cyclical rotation of the openings of the drum past the nozzles, from where it is transported onto a cooling surface. The gap which is eccentrically provided in these devices serves, exclusively for syphoning back into the drum through its openings, residual liquefied material that has not exited in the form of drops, is adhering to the exterior of the drum, before the openings become aligned again with the axial gap and the nozzle strip.

The exchangeable nozzle strips make devices of this kind suitable for the production of pastilles from a wide variety of meltable material. They are, however, relatively complex.

SUMMARY OF THE INVENTION

The invention is based on the realization that the process of forming the drops can surprisingly also be performed exclusively with the aid of the known eccentric gap, and that no additional installation of nozzle strips or other devices is required if the gap is designed large enough.

The object of the invention of providing a simpler device for manufacturing pastilles of the above type is therefore met by a sickle-shaped gap which is designed large enough to receive at least the amount of liquefied material to be shaped into drops; and by the feeder device for the liquefied material consisting of a channel formed by the end of the feeder device which is located a front or entrance side of the drum, together with an extender strip located against the upper circumference of the drum. With such a device, the meltable material can first enter from outside through the openings of the drum into the gap disposed in the interior of the drum, from where it is then forced from the drum in the form of drops in the area below the lower end of the material channeling device through the effect of the continuously narrowing cross section of the channel.

The above object of the invention may, however, also be met—based on the realization according to the invention— by designing the sickle-shaped gap large enough to receive the quantity of material to be shaped into drops, as in the above design, and creating the feeder device from the hollow interior body and an opening of the hollow interior body extending into the gap narrowing in the direction in which the drum turns. Such a device, too, can in unexpected ways serve to form drops from melted material which are then cooled or gelatinized into pastilles.

In an improvement of the inventive idea, the feeder device of both designs may be adjustably mounted around the axis of the drum, so that the area in which it rests against the drum becomes adjustable along the circumference of the drum. The size of the area that is available between the end of the eccentric gap and the end of the material channeling device for the process of forming drops may thus be adjusted. This also allows for a certain level of adaptation to the viscosity of the material to be shaped into drops.

BRIEF DESCRIPTION OF THE DRAWING

The invention is shown in the drawing in the form of two exemplary embodiments and explained in the following.

DETAILED DESCRIPTION OF PREFERRED EMBODIMENTS OF THE INVENTION

Figure 1:
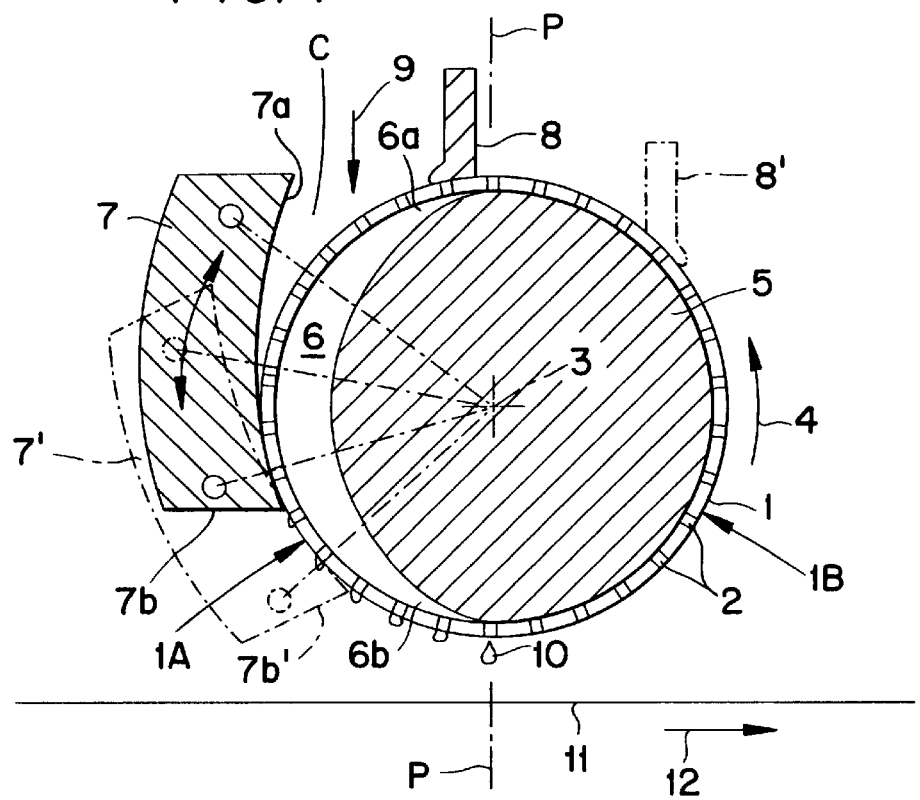
FIG. 1 is a vertical sectional view of a first embodiment of the invention in which the material to be shaped into drops is fed to a sickle-shaped gap from the drum.

FIG. 1 shows a drum (1) which has openings (2) around its entire circumference and which defines a horizontal axis (3), the drum is turned around its axis (3) in the direction of the arrow (4) by a drive not shown in the drawing. Inside the drum (1) is a stationary interior body (5) which rests against the interior surface of the rotating drum (1) along the largest portion of circumference, of the body, and forms an eccentric sickle-shaped gap (6) together with the interior surface of the drum (1) in the area of the non-contacted half of the drum (1). This gap (6) has an upper end (6a) located approximately within the area of a vertical plane (P) extending through the axis (3), and a lower end (6b) which is also located within the area of this vertical plane (P). The gap (6) is furthermore also designed with a volume large enough to hold, as a minimum, the quantity of melted material required for the process of forming drops and the quantity of exiting material on which the process is based. The drum (1) includes a front or entrance side (1A) located to the left of the plane (P), and a back or exit side (1B) located to the right of the plane (P). The front side (1A) travels toward to drop-forming zone in which the drops (10) are deposited, and the exit side (1B) travels away from the drop-forming zone. The gap (6) is disposed along the entrance side (1A).

A material channeling device (7) rests against the outer circumference of the drum (1) along part of the interior surface (7(a)) of the device. The device (7) is pivotally installed for rotation about the axis (3) and, together with the exterior surface of the entrance side (1A) of; the drum (1), forms an upwardly open inlet channel (C) for free-flowing material. At the outer circumference of the drum (1), an extender strip (8) is also attached approximately in the area of the above mentioned vertical plane (P), whereby this extender strip (8) together with the interior surface (7a) of the material channeling device (7) forms an opening for a viscous and free-flowing melted material which is added by a feeder device (9A); in the direction of the arrow (9). It would also be possible, of course, to move the extender strip (8) to the location (8'). This would also result in the formation of an opening through which free-flowing material can be supplied to the interior of the drum (1). The channeling device (7') is also movable, e.g. to the position (7') shown in broken lines in FIG. 1.

The free-flowing material, particularly melted material, added in the direction of the arrow (9), now enters into the gap (6); through the openings (2) which are open at the top in the area of the sickle-shaped gap (6). The free-flowing material then and flows down, partially due to gravity, partially also due to the rotation of the drum (1), to the lower end (6b); in which the gap (6) changes from its largest diameter back to a smaller diameter. Since the cross section of the gap (6) increases upwardly to the point of its largest diameter located approximately in the area of the opening between the surface (7a) and the extender strip (8), a known syphon-effect is exerted on the meltable material located outside the drum, which is thus syphoned in.

The openings (2) of the drum (1) located below the end (7b) of the material channeling device (7) are free. (uncovered) Since the cross section of the gap (6) also decreases in this area, the material located in the gap (6) is forced out through the openings (2) until it exits onto a moving belt (11) installed below the drum (1) in the form of drops (10) and is transported in the direction of the arrow (12). This belt (11) may be designed as a cooling belt on which the drops (10) solidify in the form of pastilles. Depending on the material to be shaped into drops, however, the belt (11) may also be designed as a conveyor belt on which the drops gelatinize into pastilles.

Figure 2:
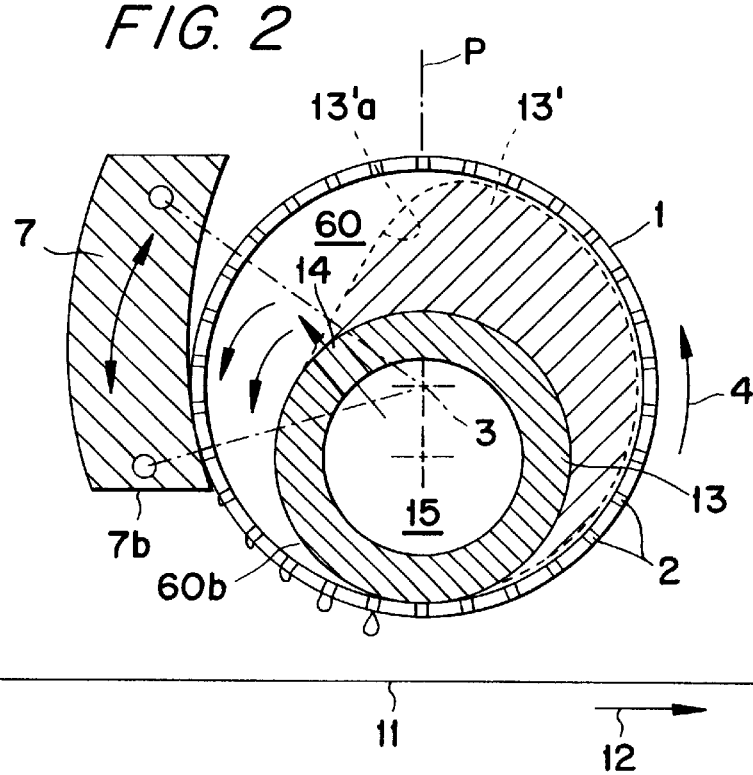
FIG. 2 is a vertical sectional view of a second embodiment of the invention in which the material to be shaped into drops is fed into shaped gap from; the interior of the drum.

FIG. 2 also shows another embodiment of the invention wherein, a rotating drum (1) has openings (2) a material channeling device (7) and a cooling or conveyor belt (11), so that the same reference numbers are used for these parts. The difference from the design shown in FIG. 1 is that this design of FIG. 2 has an interior body (13) in the shape of a hollow pipe forming a hollow space (15); through which the material to be shaped into drops is fed to the interior of the drum (1). The material, for instance a melted material, may be axially fed into the pipe-shaped interior space (15) and then leaves the hollow space (15) through openings (14) that extend from the interior body (13) into the appropriately sized sickle-shaped gap (60b) disposed between the interior body (13) and the interior surface of the drum (1) in an area to the left of a vertical plane (P) extending through axis (3). With this design, the material needs to be supplied in quantities which basically only fill the narrowing part (60b) of the sickle-shaped gap (60), so that the process of forming drops may also take place in the manner described under FIG. 1 in the area below the lower edge (7b) of the material channeling device (7). The interior body 13 engages the interior surface of the drum at a lowermost portion thereof but is spaced from all other portions thereof.

Shown in a dotted line in FIG. 2 is a variation of the design in which the interior body (13') is not designed in the form of a cylindrical pipe, like part number (13), but in the form of a body (13') with a cylindrical hollow space (15) that body (13') would rest; against the interior surface of the rotating drum (1) in the area on the right of the vertical Plane (P). In this design the material fed into gap (60) through the openings (14); does not have to be controlled in the same fashion as in the other designs to ensure that only the lower, narrowing part (60b) of the gap (60) is filled. With this design, the material to be shaped into drops may be maintained at the level of the funnel formed between the material channeling device (7) and a surface (13'a) of the body (13'). In this embodiment, like that of FIG. 1, the ends of the sickle-shaped gap are located adjacent uppermost and lowermost portions of the drum.

I claim:

1. Apparatus for making pastilles from a free-flowing substance, comprising:

a hollow drum rotatable about a horizontal axis, the drum including openings disposed around its entire circumference, the openings traveling to a drop-forming zone disposed at a lower portion of the drum, for discharging drops of a free-flowing substance supplied to the drum by a supply passage, the drum including a front side traveling toward the drop-forming zone, and a back side traveling away from the drop-forming zone;

a stationary interior body disposed within the drum in spaced relationship with an interior surface of the front side of the drum to form, together with such interior surface, a generally sickle-shaped gap extending downwardly to the drop-forming zone;

a channeling device resting against an outer surface of the front side of the drum and forming, together with that outer surface, an upwardly open inlet channel communicating with the drum openings and defining the supply passage for the free-flowing substance; and an extender strip bearing against the outer surface of the drum at a location spaced from the channeling member in a direction toward the back side of the drum, the extender strip, together with an upper open end of the channeling member, forming an inlet to the channel.

2. The apparatus according to claim 1 wherein the channeling device is rotatably movable about the horizontal axis of the drum to adjust a location of the channel relative to the drum.

3. Apparatus for making pastilles from a free-flowing substance, comprising:

a hollow drum rotatable about a horizontal axis, the drum including openings disposed around its entire circumference, the openings traveling to a drop-forming zone disposed at a lower portion of the drum, for discharging drops of a free-flowing substance supplied to the drum by a supply passage, the drum including a front side traveling toward the drop-forming zone, and a back side traveling away from the drop-forming zone; a material channeling device resting against an outer surface of the front side of the drum and forming together with that outer surface, an upwardly open channel communicating with the drum openings; and a stationary interior body disposed within the drum in contact with a lowermost portion of an interior surface of the drum and out of contact with at least a portion of the interior surface extending along the front side of the drum to form a generally sickle-shaped gap extending downwardly to the drop-forming zone, the interior body being hollow and forming the supply passage, the supply passage communicating with the gap through an opening disposed in the body at a location above the drop-forming zone.

4. The apparatus according to claim 3 wherein the channeling device is rotatably movable about the horizontal axis of the drum to adjust a location of the channel relative to the drum.

5. The apparatus according to claim 1 wherein the sickle-shaped gap includes opposite ends disposed substantially at uppermost and lowermost portions of the drum, respectively.

6. The apparatus according to claim 3 wherein the interior body is out of contact with all portions of the interior surface except the lowermost portion thereof.

7. The apparatus according to claim 3 wherein the sickle-shaped gap includes opposite ends disposed substantially at uppermost and lowermost portions of the drum, respectively.

* * * * *